United States Patent [19]

Hobart et al.

[11] Patent Number: 5,033,061
[45] Date of Patent: * Jul. 16, 1991

[54] LASER ALIGNMENT SERVO METHOD AND APPARATUS

[75] Inventors: James L. Hobart; Wayne S. Mefferd, both of Los Altos Hills; Bruce Peuse, San Carlos, all of Calif.

[73] Assignee: Coherent, Inc., Palo Alto, Calif.

[*] Notice: The portion of the term of this patent subsequent to Jul. 3, 2007 has been disclaimed.

[21] Appl. No.: 535,848

[22] Filed: Jun. 11, 1990

Related U.S. Application Data

[63] Continuation of Ser. No. 342,361, Apr. 24, 1989, Pat. No. 4,939,739.

[51] Int. Cl.$^5$ .............................................. H01S 3/08
[52] U.S. Cl. .................................. 372/107; 372/98; 372/38; 372/33
[58] Field of Search ............... 372/107, 38, 20, 32, 372/92, 98, 33, 99

[56] References Cited

U.S. PATENT DOCUMENTS 4,853,935 8/1989 Lainé et al. .......................... 372/32
4,905,243 2/1990 Lokai et al. .......................... 372/32
4,939,739 7/1990 Hobart et al. ....................... 372/107

Primary Examiner—Léon Scott, Jr.
Attorney, Agent, or Firm—Limbach, Limbach & Sutton

[57] ABSTRACT

A servo alignment method and apparatus for maintaining laser beam alignment. An operating parameter of the laser (such as output beam power) is measured, and error signals are generated from the measured operating parameter signal for controlling the laser beam alignment. In one class of embodiments, modulation signals are supplied to an intra-cavity component of a laser system to modulate the beam path. The beam path may be modulated by reciprocating a laser resonator mirror about a mirror axis or two substantially orthogonal mirror axes. In the latter case, the mirror may be vibrated about the axes either alternately (first about one axis and then about the other) or simultaneously. In embodiments in which an intra-cavity component is modulated, the laser operating parameter is measured during such modulation, the measured operating parameter signal is demodulated (preferably by multiplication in a mixer with a selected frequency component of the modulation signal currently being asserted, and error signals are generated from the demodulated signal for controlling the laser beam alignment.

11 Claims, 4 Drawing Sheets

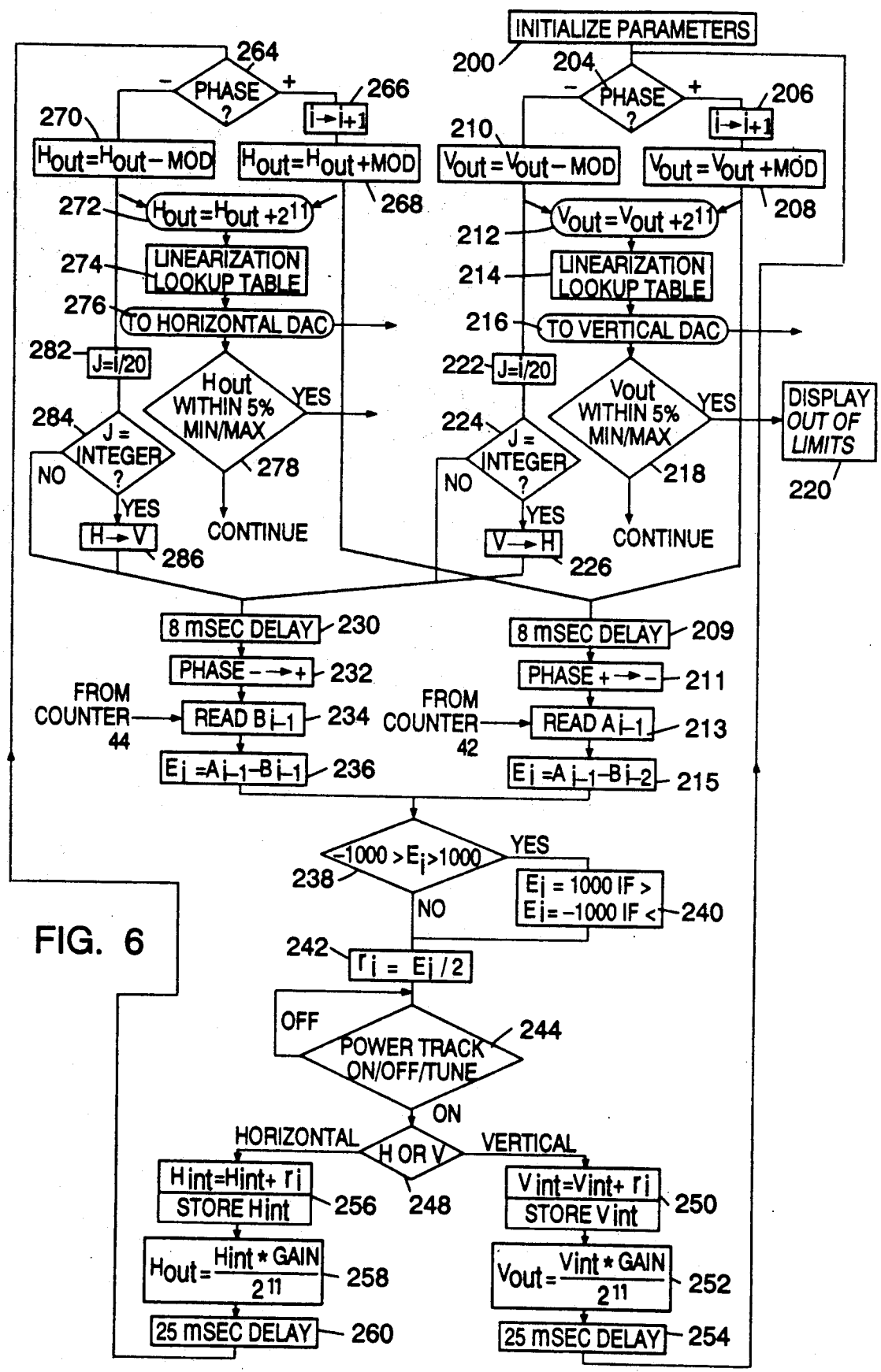

LASER ALIGNMENT SERVO METHOD AND APPARATUS

This is a continuation of application Ser. No. 07/342,361, filed Apr. 24, 1989, and now U.S. Pat. No. 4,939,739.

FIELD OF THE INVENTION

The invention is a servo alignment method and apparatus for maintaining laser beam alignment. More particularly, the invention is a servo alignment method and apparatus in which an operating parameter of a laser (such as the output beam power) is measured while the beam alignment is modulated (such as by oscillating one of the laser resonator mirrors), and an error signal for controlling the beam alignment is generated by demodulating the measured operating parameter signal.

BACKGROUND OF THE INVENTION

In a broad class of laser systems, the output beam power depends on the alignment of components within the optical cavity which determine the beam path. For example, in a broad class of laser systems the output beam power depends on the alignment of the resonator mirrors. The resonator of an ion laser is often designed to operate near to instability, so that the output power of this type of laser is particularly sensitive to small changes in resonator mirror alignment. High power ion lasers are so sensitive to resonator mirror misalignment that the output power of this type of laser typically changes by one percent or more per microradian of resonator mirror rotation.

Furthermore, high power ion lasers typically convert large amounts (up to 60 kW) of electric power into heat. This waste heat is typically dissipated into a water jacket surrounding the plasma tube. Under such conditions, it is extremely difficult to prevent resonator mirror misalignment due to thermal effects.

Most conventional lasers do not include means for actively stabilizing their optical cavities. Typically, their mechanical configuration is instead carefully designed, and they are constructed using high-performance materials, so that the resonator alignment is relatively insensitive to the effect of thermal gradients on the system. However, such conventional "passively stabilized" systems are inherently limited. They do not accurately maintain mirror alignment under conditions of changing heat load, such as when the laser is first turned on, when the output power level is changed, when the plasma tube current or cooling water temperature changes, or when the temperature of the surrounding environment (i.e., laboratory or factory) changes. As a result of this limitation, in most laser systems whose gain medium produces a significant heat load, a waiting period must be allowed for the laser to warm-up or to adjust to changes. Attempts to use the laser during such waiting period will result in power drift and the need for repeated manual adjustments to the resonator mirror alignment.

It would be desirable to maintain precise resonator mirror alignment (i.e., alignment within less than one microradian) in an active manner, to assure optimum output power under all operating conditions, including when the resonator is subjected to significant mechanical noise. It would also be desirable to maintain laser beam alignment automatically, to stabilize a laser's output power soon after the laser is started up (without a lengthy warmup period) and so that the laser may then undergo long periods of unattended operation. However, until the present invention it has not been known how to accomplish both these objectives.

The inventors have recognized that a useful laser beam alignment feedback signal may be extracted from the monitored output power of a laser (or some other monitored laser operating parameter) if a low amplitude, high frequency ripple ("dither") is imposed on the laser output power. It had not been appreciated until the present invention that practical, active, beam alignment may be accomplished in the case that such ripple has amplitude sufficiently small so that the ripple does not detract significantly from operation of the laser. Accordingly, it had not been appreciated until the present invention that active beam alignment may be accomplished in a manner improving the overall performance of a laser, with imposition of an insignificantly low amplitude ripple in the laser's output power. The invention employs a servo technique with phase sensitive detection to maintain intra-cavity laser beam alignment actively. While servo techniques with phase sensitive detection have not been employed to maintain intra-cavity laser beam alignment, they have been employed in laser systems for purposes other than intra-cavity laser beam alignment.

For example, the laser system of U.S. Pat. No. 4,514,849, issued on Apr. 30, 1985 to Witte, et al. and assigned to Coherent, Inc. (the assignee of the present application), employs a servo technique with phase sensitive detection to aim an ion laser beam at a dye laser so that the ion laser beam serves to pump the dye laser. In the Witte system, a positioning mirror directs the ion laser beam at the dye laser, and a rotating wedge is placed in the ion laser beam path (outside the resonator of both the ion laser and the dye laser) between the positioning mirror and the dye laser to modulate both the horizontal and vertical components of the ion laser beam's direction of incidence at the dye laser. The dye laser output is measured and supplied to a pair of phase detectors. Square wave reference signals (having frequency and phase corresponding to the horizontal and vertical modulation signal components) are also supplied to the phase detectors. Each phase detector compares the phase angles of the signal pair it receives to generate an error signal for controlling either the horizontal or vertical alignment of the positioning mirror.

However, the Witte system neither teaches nor suggests vibrating the positioning mirror to be aligned, and the Witte system includes no means for controlling the alignment of any intra-cavity component to maintain optimal intra-cavity beam alignment.

SUMMARY OF THE INVENTION

The invention is a servo method and apparatus for maintaining laser beam alignment. An operating parameter of the laser (such as output beam power) is measured, and error signals are generated from the measured operating parameter signal for controlling the laser beam alignment.

In one class of embodiments, modulation signals are supplied to an intra-cavity component of a laser system (such as a laser resonator mirror) to modulate the beam path. The beam path may be modulated by reciprocating a laser resonator mirror about an axis or two substantially orthogonal axes. In the latter case, the mirror may be vibrated about the axes either alternately (first about one axis and then about the other) or simultaneously. In embodiments in which an intra-cavity component is modulated, the laser operating parameter is measured during such modulation, the measured operating parameter signal is demodulated (preferably by multiplication in a mixer with a selected frequency component of the modulation signal currently being asserted), and error signals are generated from the demodulated signal for controlling the laser beam alignment.

In one example, transducers reciprocate a laser resonator mirror about two orthogonal mirror axes while an error signal is generated for each axis, the error signals are then integrated, and the integrated error signals are then supplied to the transducers to tip the mirror into an optimal orientation (an orientation achieving optimal laser beam alignment).

One preferred embodiment includes a pair of transducers for independently controlling the alignment of a resonator mirror about either of a pair of orthogonal axes (sometimes referred to herein as horizontal and vertical axes), and mirror modulation signals are alternately supplied to the transducers. Each mirror modulation signal has a DC component and a time varying component having frequency $f_0$ (for example, a 15 Hz square wave). A photodetector monitors the laser output beam power, and a band pass filter is provided for filtering the analog output signal from the photodetector. The band-pass filtered analog photodetector output is supplied to a first A-to-D converter and a second A-to-D converter. The A-to-D converters are alternately reset (180 degrees out of phase) at the mirror modulation frequency $f_0$.

The output of each A-to-D converter is a series of digital pulses, where the width of each pulse represents the amplitude of the photodetector signal during an integration period. Each such digital signal is supplied from the relevant A-to-D converter to a down counter. The output of each down counter is a sequence of digital signals, each representative of the width of one of the A-to-D converter output pulses.

Consecutive digital signals from the down counters are subtracted in a central processing unit, to generate an error signal indicative of the phase of the laser beam output signal. The error signal is integrated and fed back as a control signal to the proper mirror transducer. The invention employs the integrated error signal to servo the mirror into its optimal DC orientation about one axis during vibration of the mirror about such axis, and to servo the mirror into its optimal DC orientation about the other axis during vibration of the mirror about such other axis.

In another preferred embodiment, the modulation signals vibrate a laser resonator mirror simultaneously about two orthogonal mirror axes, at a first vibration frequency component ($f_0$) about one axis and a second vibration frequency component ($f_1$) about the other. In this embodiment, the invention includes two separate servo circuits, each employing a different frequency component ($f_0$ or $f_1$) of a measured laser operating parameter as a feedback signal.

BRIEF DESCRIPTION OF THE DRAWINGS

FIG. 6 is a detailed flow diagram showing a preferred embodiment of the process steps implemented by the central processing unit of the FIG. 1 apparatus.

DETAILED DESCRIPTION OF THE PREFERRED EMBODIMENTS

The inventive method will be described with reference to the system of FIG. 1 and the graphical representation of FIG. 2.

Figure 1:
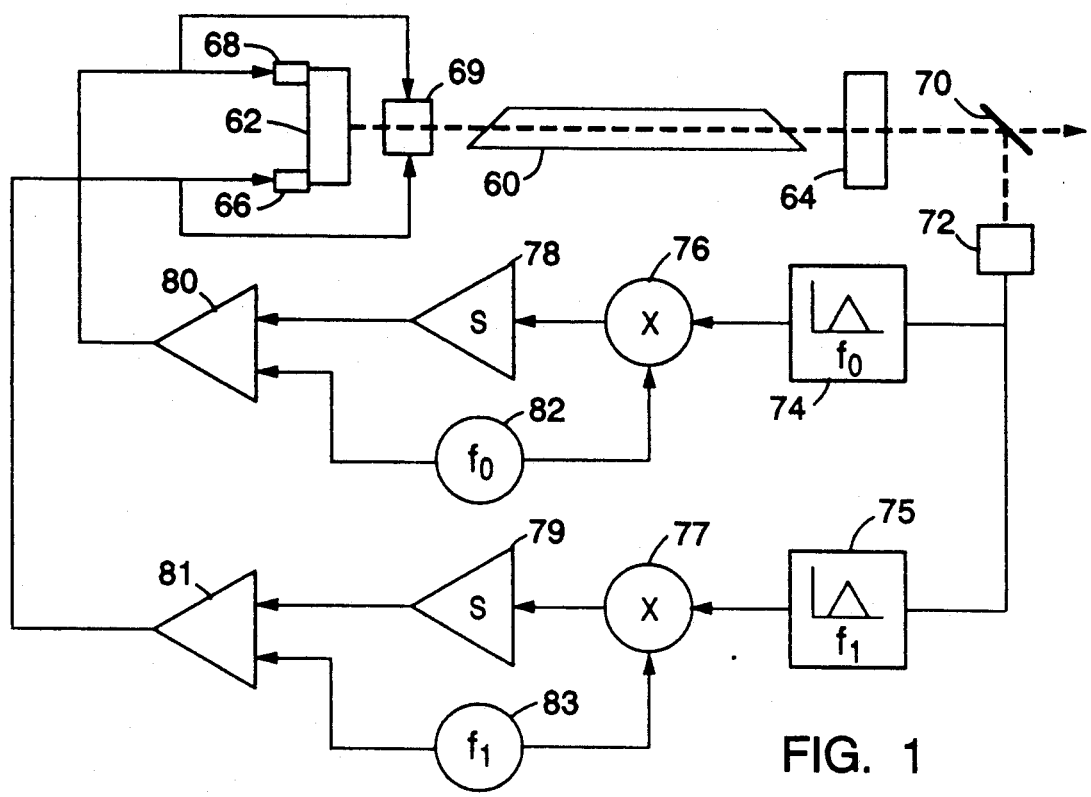
FIG. 1 is a block diagram of a preferred embodiment of the inventive apparatus.

The FIG. 1 system includes a laser having an optical cavity including gain medium 60, resonator end mirror 62, and partially transmissive resonator output mirror 64. Since output mirror 64 is partially transmissive, the laser output beam propagates toward the right, from gain medium 60 through beam splitter 70. A portion of the output beam is reflected from beam splitter 70 toward photodetector 72. Photodetector 72 monitors the output beam power, and supplies a signal indicative of the instantaneous output beam power to band pass filters 74 and 75.

Alternatively, detector 72 may be replaced by a detector for monitoring some other operating parameter of the laser, and such monitored parameter may be supplied to filters 74 and 75 instead of the output signal of detector 72. For example, in some lasers (such as $CO_2$ and HeNe lasers) the amount of input power supplied to gain medium 60 is proportional to the output beam power. For this type of laser, variations in the input power supplied to the gain medium may be monitored and supplied to filters 74 and 75. For another example, some lasers employ a servo system to control the laser output by regulating the power input to the laser. An Innova 200 ion laser (available from Coherent, Inc.) employs such a servo system when operated in its "Light Control" mode. For this type of laser, too, it would be appropriate to monitor the input power supplied to the laser, and to supply a signal indicative of the monitored input power as the input to filters 74 and 75.

Examples of laser operating parameters (other than output beam power and input power) which may be monitored in performing the invention include discharge current, noise, and the mode of the laser's output beam. An alternative laser operating parameter monitoring means will be described below with reference to FIG. 7.

Transducers 66 and 68 are provided for vibrating mirror 62 about two substantially orthogonal mirror axes. The control signal for transducer 68 is supplied from driver 80, and the control signal for transducer 66 is supplied from driver 81. The control signal for transducer 68 has a DC component supplied from integrator circuit 78 and a time varying component, also referred to herein as a "modulation signal," supplied from oscillator 82. Similarly, transducer 66's control signal has a DC component supplied from integrator circuit 79 and a time varying component ("modulation signal") supplied from oscillator 83. The modulation signal for transducer 68 includes the frequency component $f_0$, and the modulation signal for transducer 66 includes the frequency component $f_1$.

Transducers 66 and 68 may be alternately driven (180 degrees out of phase), or may be simultaneously driven. If they are simultaneously driven, the frequency components $f_0$ and $f_1$ must differ. If they are alternately driven, the frequency components $f_0$ and $f_1$ may be identical or different.

In an embodiment in which transducers 66 and 68 are alternately driven, components 75, 77, 79, 81, and 83 of the FIG. 1 system may be omitted, and transducer 66 instead connected to the output terminal of driver 80.

Band pass filters 74 and 75 are designed to pass the time-varying components, having modulation frequencies $f_0$ and $f_1$, respectively, of the signal they receive from detector 72, in order to reduce the effect of noise on operation of the FIG. 1 system. However, filters 74 and 75 may be omitted from alternative embodiments of the invention.

The band-pass filtered photodetector output signal emerging from filter 74 is supplied to mixer 76, and the output signal from filter 75 is similarly supplied to mixer 77. Mixer 76 also receives a signal having frequency $f_0$ from oscillator 82, and mixer 77 receives a signal having frequency $f_1$ from oscillator 83. Mixers 76 and 77 demodulate the time-varying signals from filters 74 and 75, respectively, so that each produces an error signal indicative of the phase of the time-varying signal from the filter connected thereto. These error signals are respectively integrated in integrators 78 and 79. The integrated error signals emerging from units 78 and 79 are supplied to summing amplifiers 80 and 81, respectively. In each mixer, the demodulation operation is performed by multiplying the signal received from the oscillator with the time-varying signal received from the filter.

Summing amplifiers 80 and 81 (sometimes referred to herein as transducer drivers) also receive the outputs of oscillators 82 and 83, respectively. Amplifier 80 (81) sums its two input signals and amplifies the summed signal. The output of amplifier 80 (81) is thus a transducer driving signal whose DC amplitude follows the amplitude of the integrated error signal emerging from integrator 78 (79) and whose frequency component $f_0$ ($f_1$) has average amplitude determined by oscillator 82 (83).

The signal output from summing amplifier 80 will thus oscillate (or "dither") mirror 62 about its horizontal axis, and the signal output from summing amplifier 81 will oscillate mirror 62 about its vertical axis, with the DC component of each signal determining the average (DC) orientation of the mirror about one of the horizontal and vertical axes.

It should be appreciated that the expressions "horizontal mirror axis" and "vertical mirror axis" are used in a general sense throughout this Specification (including in the claims) to denote any two substantially orthogonal mirror axes. The terms "vertical" and "horizontal" are not used in their narrow sense, in which they denote directions parallel and perpendicular, respectively, to the direction of the earth's gravitational field at the earth's surface. The "vertical" and "horizontal" mirror axes referred to in this Specification may have any orientation relative to the direction of the earth's gravitational field at the earth's surface.

The invention is not limited to a method and system for servo aligning a resonator mirror. Instead, it is specifically contemplated that an intra-cavity component other than a resonator mirror may be servo aligned in accordance with the invention. In accordance with the invention, such intra-cavity component (element 69 in FIG. 1) is dithered to modulate the beam path (and hence, to modulate the operating parameter monitored in performing the invention). For example, the alignment of a lens, the heat supplied to a window, or a variable wedge element positioned in the beam path within the optical cavity may be dithered to modulate the beam path. In order to attain a desired laser beam alignment, one or more error signals generated from the monitored operating parameter signal will then be employed to generate control signals for urging the intra-cavity component into a desired alignment. In FIG. 1, for example, control signals are supplied from drivers 80 and 81 to intra-cavity element 69.

Figure 2:
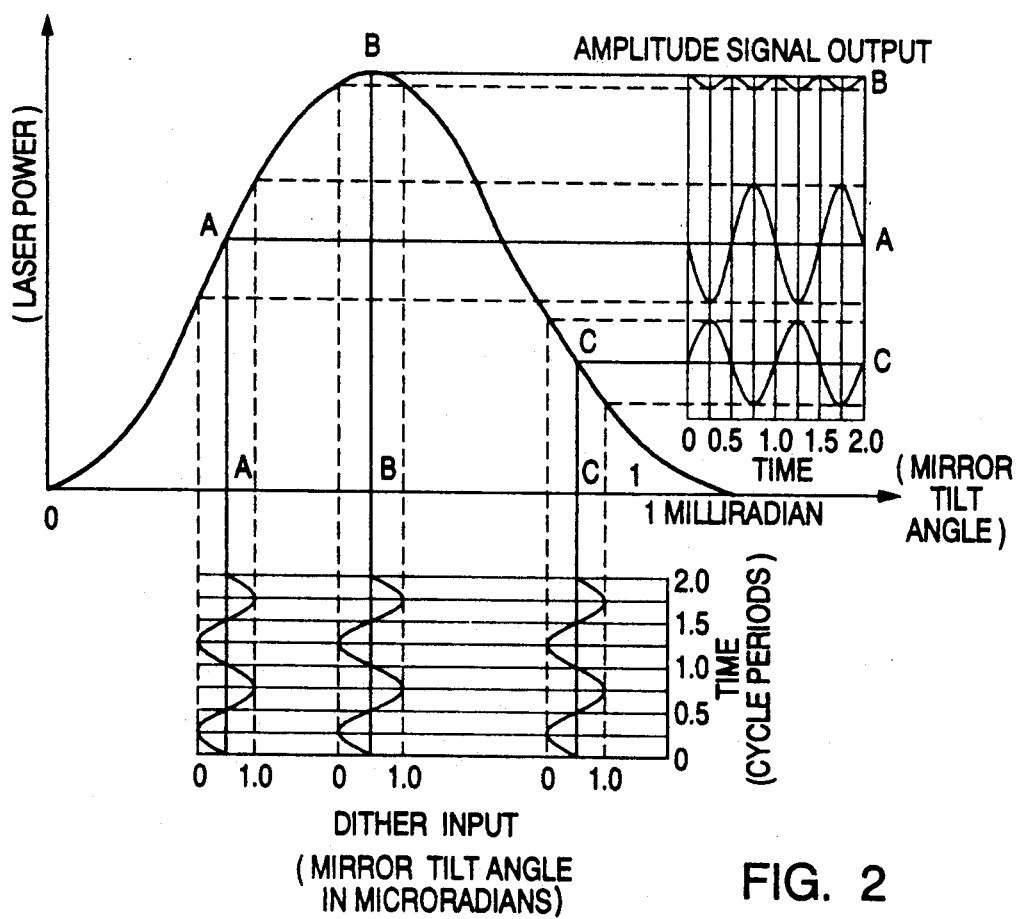
FIG. 2 is a graphical representation of the output power of a laser as a function of resonator mirror orientation.

The basic operating principle of the inventive system will be appreciated with reference to FIG. 2. The large graph in FIG. 2 represents the output power of a laser having an adjustable intra-cavity component, and changes in the alignment of such component will alter the laser beam path (i.e., the laser beam alignment). For specificity, it shall be assumed for the remainder of the description of FIG. 2 that the intra-cavity component is an adjustable resonator mirror, and that the laser beam alignment is a function of the mirror's orientation about either of its vertical and horizontal axes. The laser output power has a single local maximum at point B. It should be appreciated that the invention is useful for aligning an intra-cavity component (i.e., resonator mirror) of any laser system in which the laser beam alignment and output power are critically dependent on the alignment of such component and in which the laser output power has a single local maximum as a function of the orientation of the intra-cavity component (i.e, the tilt of a resonator mirror).

FIG. 2 shows that if the resonator mirror angle is modulated ("dithered") with a peak to peak modulation angle of one microradian about the optimal mirror orientation angle (the angle corresponding to point B on the output power curve), the laser output power will be modulated at a frequency twice that of the mirror angle modulation frequency (and the time varying component of the modulated laser output will have a low amplitude). If the resonator mirror angle is dithered with a peak to peak modulation angle of one microradian about the angle corresponding to point A on the output power curve, the laser output power will also be modulated, but at a modulation frequency half that at point B (and the time varying component of the modulated laser output will have a higher amplitude than at point B). Similarly, if the resonator mirror angle is dithered with a peak to peak modulation angle of one microradian about the angle corresponding to point C on the output power curve, the laser output power will be modulated, but at a modulation frequency half that at point B and 180 degrees out of phase with respect to that at point A (and the time varying component of the modulated laser output will have a higher amplitude than at point B). At point C, the time varying component of the modulated laser output will have substantially the same "higher amplitude" time varying component as at point A.

Because the time-varying components of the output power signals at points A and C are substantially 180 degrees out of phase, when the mirror tilt angle is increased from point A on the curve, the output power will increase, and when the mirror tilt angle is increased from point C on the curve, the output power will decrease. Thus, the output power signals are suitable for use as feedback signals in the inventive servo control system for aligning the resonator mirror.

It will readily be appreciated that the same phase and frequency relation between the modulated output signals at various points on the output power curve will result regardless of the precise waveform of the dither input signal. For example, in the preferred embodiment to be described with reference to FIG. 3, in which the time varying component of the dither input signal is a square wave (rather than a sinusoidal signal as in FIG. 2) and the time varying component of the laser beam output signal is also a square wave, the phase of the time varying component of the laser beam output signal at point A on the curve will differ by about 180 degrees from that at point C on the curve (and the frequency of the time varying component of the laser beam output signal at point B on the curve will be twice that of the time varying component of the laser beam output signal at point A on the curve).

Another preferred embodiment of the inventive system will next be described with reference to FIGS. 3 and 4. The system of FIGS. 3 and 4 includes automatic gain control means.

Figure 3:
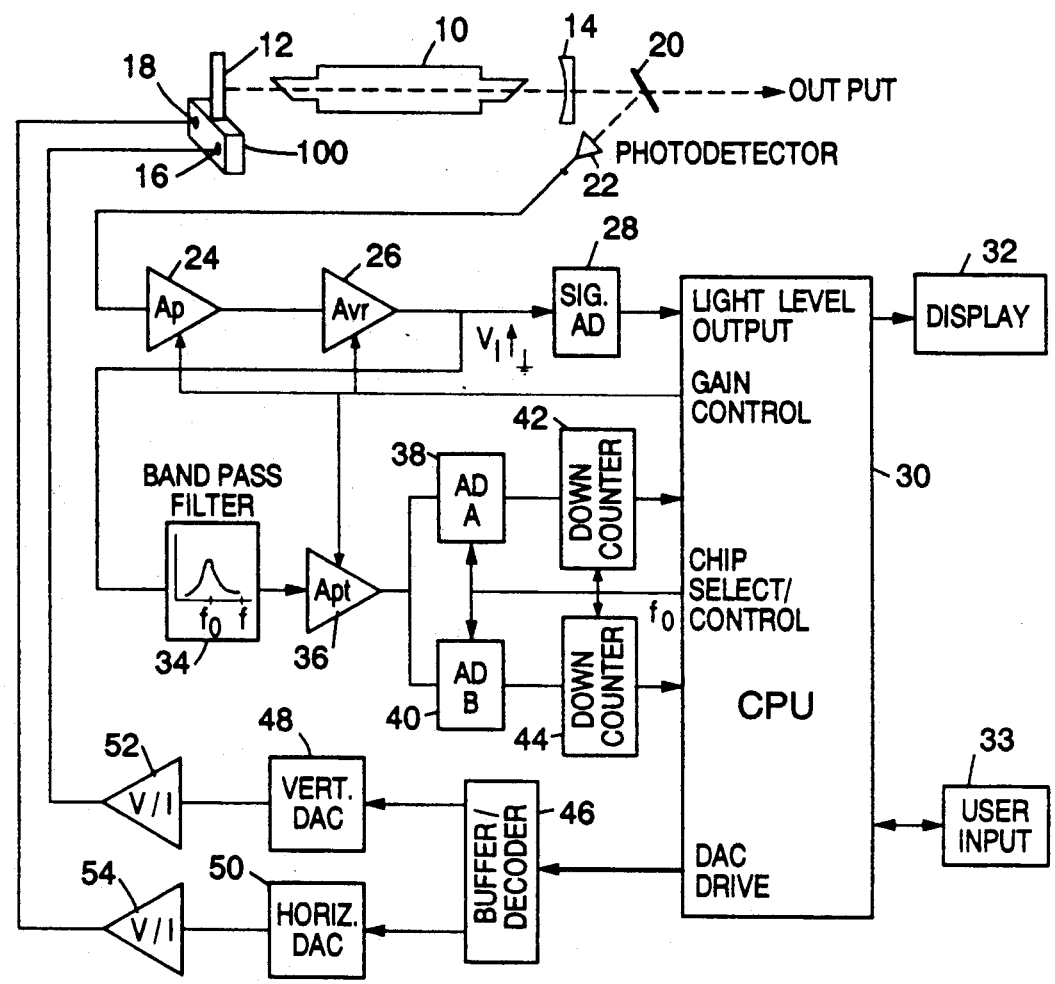
FIG. 3 is a block diagram of another preferred embodiment of the inventive apparatus.

FIG. 3 shows an ion laser having an optical cavity including plasma tube 10, resonator end mirror 12, and partially transmissive resonator output mirror 14. As in the FIG. 1 system, because output mirror 14 is partially transmissive, the laser output beam propagates toward the right, from tube 10 through beam splitter 20. A portion of the output beam is reflected from beam splitter 20 toward photodetector 22. Photodetector 22 monitors the output beam power, and supplies an analog signal indicative of the instantaneous output beam power, through amplifiers 24 and 26, to band pass filter 34 and analog to digital ("A-to-D") converter 28.

The laser's output beam power may alternatively be monitored indirectly (such as by monitoring the laser's plasma tube current), or some other laser operating parameter may be monitored. In a variation in which a plasma tube current signal is generated, the plasma tube current signal would be supplied through amplifiers 24 and 26 to band pass filter 34 and A-to-D converter 28. It may be desirable to employ the plasma tube current monitoring embodiment, for example, when the laser's output beam power is controlled by a servo (not shown in FIG. 1) which is faster than the servo means of the inventive apparatus.

End mirror 12 is fixedly attached to tilt plate 100. Plate 100 is typically rotatably mounted to a frame (not shown) supporting all the laser components, including plasma tube 10 and mirrors 12 and 14. Plate 100 is mounted with two degrees of rotational freedom, so that plate 100 and mirror 12 may be rotated as a unit about their vertical axis by transducer 16, and may be rotated as a unit about their horizontal axis by transducer 18.

The control signal for transducer 16 is supplied from CPU 30 (in digital form), through buffer/decoder circuit 46, digital-to-analog ("D-to-A") converter 48, and amplifier 52. The control signal for transducer 18 is supplied from CPU 30 (in digital form), through buffer/decoder circuit 46, digital-to-analog ("D-to-A") converter 50, and amplifier 54.

In one preferred embodiment of the inventive method, mirror 12 is alternately vibrated at a modulation frequency ($f_0$) about its vertical axis, and at the same frequency about its horizontal axis. For example, the drive circuitry comprising amplifiers 52 and 54, D-to-A converters 48 and 50, and buffer/decoder 46 may alternately vibrate transducers 16 and 18 by supplying a square wave signal of frequency $f_0 = 15$ Hz to transducer 16 for a 1.33 second period, and then a square wave signal of the same frequency to transducer 18 for the next 1.33 second period, and so on. In this case, the output of photodetector 22 will have a time-varying component having such modulation frequency $f_0$.

In another preferred embodiment of the invention, mirror 12 is vibrated simultaneously about its vertical and horizontal axes, with a vibration frequency component ($f_0$) for vibration about one axis and a different vibration frequency component ($f_1$) for vibration about the other axis. Alternatively, mirror 12 could be vibrated simultaneously about its vertical and horizontal axes at the same vibration frequency for each axis but with a different vibration phase for each axis.

Band pass filter 34 is designed to pass the time-varying component (having modulation frequency $f_0$) of the signal it receives, in order to reduce the effect of noise on operation of the FIG. 3 system. In an embodiment in which $f_0$ is 15 Hz, filter 34 includes a 2-pole high pass filter followed by a 2-pole low pass filter with the corner frequency at 15 Hz, and preferably has quality factor Q substantially equal to 1.5.

The optimal modulation frequency for a given embodiment of the invention is determined by examining the noise power density spectrum of the laser output, and selecting a frequency in this spectrum at which noise is very low (preferably, at a minimum). Usually this "low noise" frequency will be a high frequency since many physical systems have a power density spectrum inversely proportional to their output frequency. For a system including an Innova 200 ion laser (available from Coherent, Inc.), and mirror transducers having a maximum frequency response of 50 Hz, the upper bound for the modulation frequency is determined by the transducer response (50 Hz). For frequencies less than 50 Hz, we identified a minimum in the output power spectrum at about 15 Hz (indicating that noise in the output power spectrum has a minimum at this frequency). Accordingly we have selected 15 Hz as the preferred modulation frequency for such a system.

Each of amplifiers 24 and 26 receives a gain control signal from CPU 30. The level of each gain control signal is varied in response to measured operating parameters of the laser, preferably so as to maintain the output of amplifier 26 within the range from 0.7 volts to 9 volts regardless of variations in the output beam power and variations in photodetector 22's sensitivity. The gain of amplifier 26 is preferably toggled between one and ten, and the gain of amplifier 24 is preferably stepped between the gain values one, ten, and one hundred.

The output of filter 34 is amplified in amplifier 36. Amplifier 36, too, preferably receives a gain control signal from CPU 30, so that CPU 30 may control the gain of amplifier 36 to maintain the overall gain of the FIG. 3 circuitry relatively constant despite variations in voltage signal output by photodetector 22.

The band-pass filtered, amplified analog photodetector output signal emerging from amplifier 26 is supplied to the "mixer" comprising A-to-D converters 38 and 40, and down counters 42 and 44. A-to-D converters 38 and 40 are alternately reset (180 degrees out of phase) by CPU 30, at the mirror modulation frequency $f_0$.

The output of each of A-to-D converters 38 and 40 is a series of pulses, each having a pulse width representing the amplitude of the analog signal from amplifier 26 integrated over an integration period. The digital output of A-to-D converter 38 is supplied to down counter 42, and the digital output of A-to-D converter 40 is supplied to down counter 44. The output of each down counter is a sequence of digital signals, each representing the width of one of the A-to-D converter output pulses. The down counters are updated at the mirror modulation frequency $f_0$, each 180 degrees out of phase with respect to the other (so that both down counters are updated during each mirror modulation cycle).

Consecutive digital signals from the down counters are processed in CPU 30 (in a manner to be more fully described below with reference to FIG. 6) to provide a measure of the phase of the laser beam output signal. The manner in which CPU 30 processes the digital signals from counters 42 and 44 may be summarized as follows: CPU 30 samples both counter 42 and counter 44 once each mirror modulation period (i.e., with sampling frequency $f_0$) and the most recently sampled output from counter 44 (or the output from counter 44 for the previous sample period) is subtracted from the most recently sampled output from counter 42.

Input device 33, of any conventional type, is connected to CPU 30 to facilitate entry of data and commands by a system user. Display unit 32 is connected to CPU 30 for displaying the output of the CPU. Input device 33 may, for example, include an on/off control enabling the user to switch the inventive system on or off.

Preferably, each of A-to-D converters 38 and 40 is an integrating converter (such as a TSC500A integrating A-to-D converter available from Teledyne) capable of providing signal averaging as well as analog to digital conversion.

Figure 4:
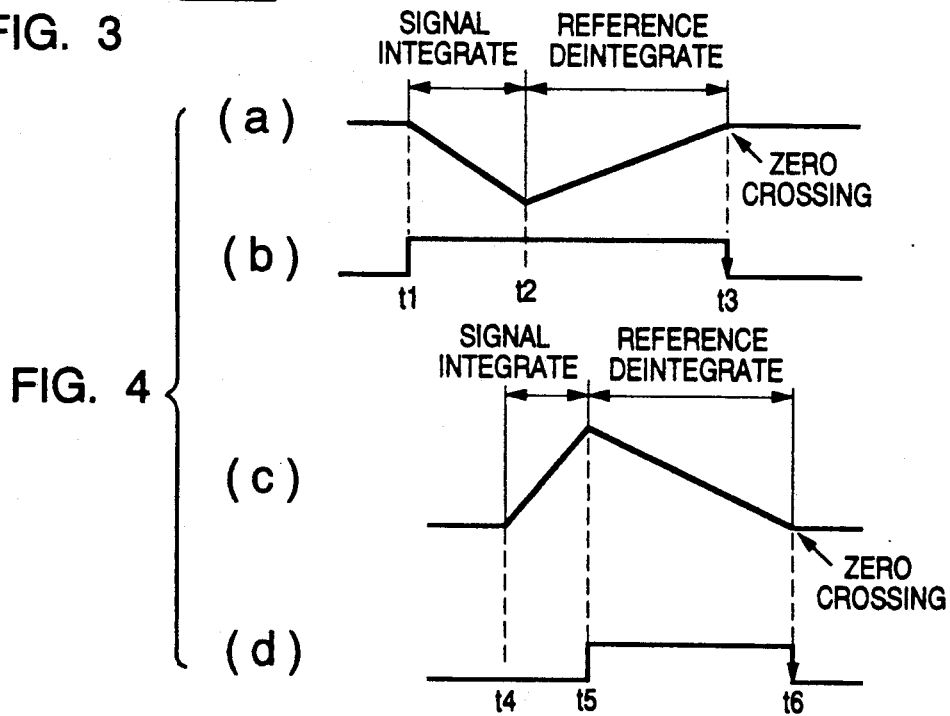
FIG. 4 is a set of four graphs showing signals in various stages of processing in one of the analog-to-digital converters of the FIG. 1 apparatus.

The four graphs of FIG. 4 comprise a timing diagram for either one of converters 38 or 40 in an embodiment in which each is a TSC500A integrating A-to-D converter. Graphs (a) and (b) of FIG. 4 cover the case that a positive analog input signal is received, and graphs (c) and (d) cover the case that a negative analog input signal is received.

A model TSC500A A-to-D converter includes an integrator circuit, and a comparator for receiving the output of the integrator circuit. Either the band-pass filtered, amplified, signal, or a reference voltage signal, is supplied to the input of the integrator. The input signal to the integrator circuit is integrated during an integration phase, which occurs during the period between t1 and t2 in graph (a) of FIG. 4 and during the period between t4 and t5 in graph (c) of FIG. 4. The duration of the integration phase is controlled by control signals generated in appropriately programmed CPU 30 and supplied to converters 38 and 40.

At the end of the integration phase, CPU 30 initiates a "deintegration phase" in which CPU 30 causes the reference voltage to be supplied to the input of the integrator, as a substitute for the analog signal from amplifier 36. The reference voltage is positive or negative, depending on the polarity of the integrator's output at the end of the integration period. During the deintegration phase (between times t2 and t3 in graph (a) of FIG. 4 and between times t5 and t6 in graph (d) of FIG. 4), the absolute magnitude of the integrator's output ramps down to zero volts. The duration of this deintegration (or "ramp down") period is a measure of the amplitude of the analog photodetector signal.

As shown in graph (b) of FIG. 4, the output of the comparator has a rising edge at the start of the integration period (when the analog photodetector signal is positive) and a falling edge at the end of the deintegration period. As shown in graph (d) of FIG. 4, the output of the comparator has a rising edge at the end of the integration period (when the analog photodetector signal is negative) and a falling edge at the end of the deintegration period. With reference again to FIG. 3, the comparator output of converter 38 is supplied to down counter 42, and the comparator output of converter 40 is supplied to down counter 44. Each down counter supplies to CPU 30 a digital signal representing the partial width of each comparator pulse it receives (measured from the commencement of the deintegration phase to the falling edge of the comparator pulse). For example, the down counter would generate a digital signal representing the width of the comparator pulse of graph (d) of FIG. 4 between times t5 and t6.

An important feature of the embodiment of FIGS. 3 and 4 is the mixer's ability to reject coherent noise. A high noise rejection ratio is achieved by setting the integration period (described with reference to FIG. 4) so as to correspond to a harmonic or subharmonic of the noise to be rejected (i.e., a 60 Hz noise signal). The dominant coherent noise signal to be rejected may be a three phase waveform having a fundamental frequency component of 360 Hz (where the line voltage is 60 Hz) or 300 Hz (where the line voltage is 50 Hz).

CPU 30 generates digital control signals for vertical and horizontal mirror positioning transducers 16 and 18. The control signal for transducer 16 is supplied from CPU 30 (in digital form), through buffer/decoder circuit 46, D-to-A converter 48, and amplifier 52. The control signal for transducer 18 is supplied from CPU 30 (in digital form), through buffer/decoder circuit 46, D-to-A converter 50, and amplifier 54.

Preferably, CPU 30 is programmed to generate digital control signals for clamping each of transducers 16 and 18 at their present DC value upon detecting zero output beam power. This will prevent the inventive system from acting on small amounts of systematic noise that may enter the system electronics. The summation of such systematic noise could drive the laser into misalignment, for example while the laser's intracavity aperture is closed.

In a preferred embodiment, a multibus (including a data bus and an address bus) connects CPU 30 and buffer/decoder circuit 46, and buffer/decoder circuit 46 includes a 74LS245 integrated buffer circuit (available from Texas Instruments Inc.) for receiving an eight bit control signal on the data bus. Buffer/decoder circuit 46 also includes a 74LS24 integrated buffer circuit and two 74LS138 integrated decoder/demultiplexer circuits (all available from Texas Instruments Inc.). Address signals determining which of D-to-A converters 48 and 50 should receive and process the control signal, are supplied on the address bus to the 74LS24 circuit and the two 74LS138 circuits.

A twelve-bit D-to-A converter circuit (for example, an "AD667" circuit of the type commercially available as of this application's filing date) is suitable for use as each of D-to-A converters 48 and 50. At each moment during operation of the FIG. 3 circuitry, a selected one of D-to-A converters 48 and 50 receives the eight bit control signal supplied on the data bus from CPU 30.

The analog version of each such digital control signal emerging from converter 48 is amplified in amplifier 52 and supplied to vertical mirror positioning transducer 16, and the analog version of each such digital control signal emerging from converter 50 is amplified in amplifier 54 and supplied to horizontal mirror positioning transducer 18.

Figure 5:
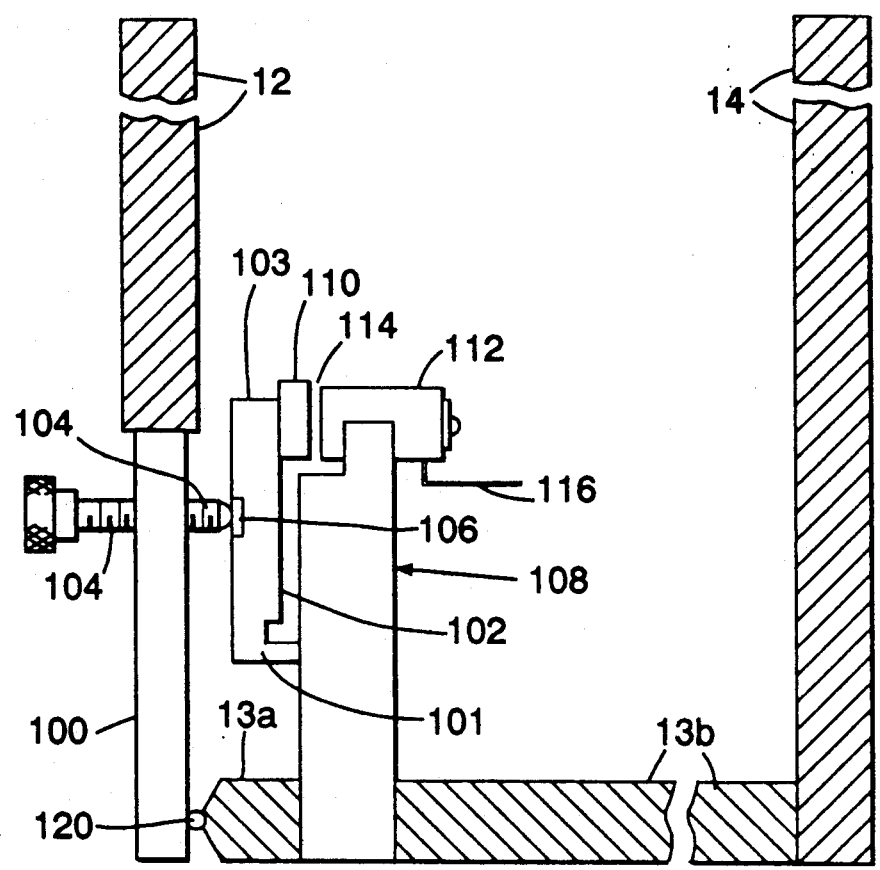
FIG. 5 is a simplified cross-sectional view of a transducer employed in a preferred embodiment for rotating a resonator mirror about either its vertical or horizontal axis.

FIG. 5 is a cross-sectional view of a preferred embodiment of a mirror positioning transducer suitable for use as transducer 16 or 18 in FIG. 3. End mirror 12 is fixedly attached to tip plate 100. Resonator web 108 is fixedly attached between frame portions 13a and 13b. Resonator tube 10 (not shown in FIG. 5) and output mirror 14 are also attached to frame portion 13b. Mirror 14 is adjustable relative to frame portion 13b, but is not servoed. The lower end of plate 100 is attached to frame portion 13a by pivot 120, so that plate 100 may pivot relative to frame portion 13a. Frame portions 13a and 13b are rigid portions of a rigid frame. Alignment screw 104 extends through plate 100, and may be advanced toward the right or retracted toward the left relative to plate 100.

Electromagnet 112 is attached to the upper end of resonator web 108, and receives control signals on line 116 from amplifier 52 (or amplifier 54). Electromagnet 112 may be manually adjusted to set the air gap 114 to a desired configuration. Lever arm 102 has a lower hinge end 101 fixedly attached to web 108, an upper free end 103 to which ferrous disk 110 is attached, and a contact pad 106 between ends 101 and 103. The tip of screw 104 is advanced sufficiently far toward the right that it abuts contact pad 106, so that mirror 12 may be manually aligned. The size of air gap 114 between disk 110 and electromagnet 112 may be adjusted by advancing or retracting electromagnet 112 manually relative to web 108, or by varying the control signal supplied on line 116 to electromagnet 112.

Hinge end 101 of arm 102 will bend relative to web 108 (and hence, relative to the rigid frame comprising portions 13a and 13b) during adjustment of air gap 114. Similarly, plate 100 will pivot about element 120 relative to the rigid frame comprising portions 13a and 13b during adjustment of air gap 114.

The current through electromagnet 112, and the air gap spacing in the absence of current through electromagnet 112, together determine the amount of magnetic force between plate 110 and electromagnet 112. The orientation of arm 102 relative to web 108 may be changed by changing the magnitude the signal supplied on line 116 to electromagnet 112. If the signal supplied on line 116 has a DC component and a time-varying component (or "modulation signal" component), the DC component will determine the average (or "DC") position of lever arm 102 relative to web 108, and the modulation signal component will cause lever arm 102 to vibrate about hinge end 101 relative to web 108 so that plate 100 and mirror 12 will accordingly vibrate about their average (or "DC") position relative to frame portion 13a and web 108. Variation of the modulation signal component's peak to peak amplitude will cause variation in the amplitude of vibration of plate 100 and mirror 12.

The FIG. 5 apparatus will serve as transducer 16 if screw 104, arm 102, plate 110, and electromagnet 112 are oriented relative to plate 100 so that interaction between plate 110 and electromagnet 112 will cause arm 102 and plate 100 (and hence, mirror 12) to vibrate about a vertical axis. The FIG. 5 apparatus will serve as transducer 18 if screw 104, arm 102, plate 110, and electromagnet 112 are oriented relative to plate 100 so that interaction between plate 110 and electromagnet 112 will cause lever arm 102 and plate 100 (and hence, mirror 12) to vibrate about a horizontal axis. For example, in the FIG. 3 apparatus, mirror 12 is fixedly attached to a single plate 100, and two of the FIG. 5 transducers are connected to single plate 100. The alignment screw 104 of one of the transducers (transducer 16) extends through a threaded orifice near a vertical edge of plate 100 so that vibration of this transducer will vibrate plate 100 (and hence mirror 12) about a horizontal axis, and the alignment screw 104 of the other transducer (transducer 18) extends through a second threaded orifice near a horizontal edge of plate 100, so that vibration of this transducer will vibrate plate 100 (and hence mirror 12) about a vertical axis.

The deflection amplitude, X, of screw 104 and plate 100 away from a quiescent (or "DC") position in which the air gap separation is $X_0$ has the following functional dependence on the voltage, V, supplied on line 116: $X = AV + B(V)^2$, where A and B are constants. In a preferred embodiment, the quiescent air gap spacing $X_0$ is substantially equal to 0.02 inches.

In alternative embodiments of the invention, other types of transducers (such as electromagnets, moving coil motors, piezoelectric devices, or stepper motors) may be employed to control the mirror position about its horizontal and vertical axes. More than one type of transducer may be used in combination. For example, transducer 16 in FIG. 3 may include a fast piezoelectric element to dither mirror 12 about its vertical axis, and transducer 16 may also include a slow stepper motor to correct the DC mirror orientation about the vertical axis.

In a preferred method of operating the FIG. 3 system, the laser output signal is sampled twice during each mirror modulation period, as described in greater detail below with reference to FIG. 6, to generate an error signal for servoing a resonator mirror to its optimal orientation. In performing this embodiment of the inventive method, CPU 30 samples the output of amplifier 36 twice during each mirror modulation period.

To summarize the FIG. 6 method, the laser output signal is sampled with twice the mirror modulation frequency to generate pairs of samples ($A_i$ and $B_i$). Adjacent samples are subtracted from each other. Thus, when the laser is operating at a point (for example, point A) to the left of the maximum power point on the output power curve, the difference signal will have a first sign (positive or negative), when the laser is operating at a point (for example, point C) to the right of the maximum power point on the output power curve, the difference signal will have the opposite sign, and when the laser is operating at the maximum power point, the difference signal will have substantially zero magnitude. Thus, when the laser output signal has a first phase (such as that at point A) the inventive apparatus will rotate the mirror's DC orientation in a first direction, and when the laser output signal has the opposite phase (such as the phase at point C), the inventive apparatus will rotate the mirror's DC orientation in the opposite direction. Thus the mirror is servoed to the maximum power point, at which the time varying component of the laser output signal has frequency substantially twice that away from the maximum power point. The inventive apparatus is capable of rapidly correcting large perturbations in mirror alignment, and is also capable of holding the optimum alignment with high precision once optimum alignment is attained.

The mirror alignment is corrected only with respect to the axis about which the mirror is being modulated at any instant. When the modulation is switched to the other orthogonal mirror axis, the mirror alignment about this other axis is corrected.

In the FIG. 6 method, CPU 30 monitors and controls the gain of the alignment servo in addition to performing various related housekeeping tasks. The first step performed by appropriately programmed CPU 30 is to initialize the parameters used in the subsequent method steps. These parameters include: MOD, indicative of the amplitude of the modulation signal being imposed on the mirror positioning transducer; PHASE, indicative of the sense (positive or negative) of the modulation signal being imposed on the mirror positioning transducer; GAIN, a loop gain parameter; Ai, the "i"th input signal from down counter 42; Bi, the "i"th input signal from down counter 44; ei, the instantaneous error signal; $r_i$, the parameter ei divided by two; $V_{int}$ and $V_{out}$, the integrated vertical error signals, representing the DC mirror orientation about its vertical axis; and $H_{int}$ and $H_{out}$, the integrated horizontal error signals, representing the DC mirror orientation about its horizontal axis.

At step 204, the sense of the modulation signal ("PHASE") is checked. If the sense is positive, the parameter "i" is incremented (step 206) and the modulation signal "MOD" is added to the integrated error signal "$V_{out}$" (step 208). The modulated error signal "$V_{out}$+MOD" is subjected to a selected delay (equal to 8 milliseconds, in one preferred embodiment) at step 209, and a biasing signal is added to the modulated error signal at step 212. In a preferred embodiment, the biasing signal is a digital signal of magnitude $(2)^{11}=2048$, for biasing the "vertical" D-to-A converter (converter 48) into the middle of its range. If the sense is negative, the modulation signal "MOD" is subtracted from the integrated error signal "$V_{out}$" in step 210, and the so-modulated error signal is processed in step 212.

An encoded version of the biased, modulated error signal is generated during linearization table lookup step 214, and this encoded, biased, modulated error signal is supplied (at step 216) on the above-described multibus to buffer/decoder circuit 46 for subsequent conversion to analog form in converter 48 for use in driving vertical mirror positioning transducer 16.

At steps 224 through 226, control signals for selectively driving either the horizontal or the vertical mirror positioning transducer are generated. At step 222, the parameter "i" is divided by a selected integer N (in one preferred embodiment, N=20) to generate the parameter "J". If J is determined not to be an integer (at step 224), then the signal "V" for selectively driving the vertical mirror positioning transducer continues to be asserted. If J is determined to be an integer (at step 224), then a signal "H" for selectively driving the horizontal mirror positioning transducer is asserted in place of signal "V". The integer N is selected so that the mirror positioning transducers 16 and 18 are alternately driven, with a selected switching frequency $f_0$. In a preferred embodiment, the parameter i is incremented once each 66.7 msec period, N=20, and $f_0=(1.33 \text{ seconds})^{-1}$.

The output of down counter 42 is a sequence of digital signals Ai, and the output of down counter 44 is a sequence of digital signals Bi. Each signal $A_i$ in the first sequence is updated at the switching frequency $f_0$, and each signal $B_i$ in the second sequence is updated at the switching frequency $f_0$, but the two sequences ($A_i$ and $B_i$) are updated out of phase with respect to each other.

After step 224, assuming for the moment that CPU 30 continues to assert the vertical mirror transducer signal "V," the modulated error signal "$V_{out}$+MOD" is subjected to a selected delay at step 209, the phase of the modulation signal is changed by reversing the sense ("PHASE") of the modulation signal at step 211, and CPU 30 reads the digital output $A_{i-1}$ of down counter 42 at step 213. CPU already has the output signal $B_{i-2}$ (the output from counter 44 for the previous 15 Hz cycle) in its memory, and computes the error signal $e_i=(A_{i-1})-(B_{i-2})$ at step 215. As will be readily understood from the explanation set forth above with reference to FIG. 4, this error signal will be positive if the mirror tilt angle is less than its optimal value, it will be negative if the mirror tilt angle is greater than its optimal value, and it will be substantially equal to zero if the mirror tilt angle is substantially equal to its optimal value.

During the next steps, steps 238 and 240, the error signal $e_i$ is clamped, if necessary, to reduce the effect of spurious noise on operation of the inventive system. At step 238, CPU 30 determines whether the error signal has absolute magnitude less than a selected value X (in a preferred embodiment, X=1000). If not, the error signal (if it is positive) is set equal to $+X$ and the error signal (if it is negative) is set equal to $-X$. If the error signal has absolute magnitude less than the selected value X, it is divided by two (at step 242). Each clamped error signal generated in step 240 is also divided by two (at step 242). The error signal, and hence the overall loop gain, is halved during step 242 to increase the system's noise averaging time. Step 242 may be omitted in an alternative embodiment of the invention.

At step 244, the decision is made whether to continue operating the inventive servo loop, or to cease operating it indefinitely or for a selected duration. Of course, step 244 may be omitted in an alternative embodiment of the invention. Where step 244 is performed, it preferably includes the following substeps: (a) monitoring the status of the on/off control of input device 33; (b) measuring the voltage $V_1$ between the input to A-to-D converter 28 and ground, and switching the system "off" if the measured voltage is less than 1% of the maximum A-to-D input voltage level for the system (and switching the system "on" when the measured voltage rises to 1% of the maximum A-to-D input voltage level); and (c) monitoring the gain setting of amplifiers 24 and 36, and switching off the system for a selected period if the gain setting changes by at least a preselected amount (i.e., switching off the system for 15 cycles, or 0.5 seconds, if the gain setting for amplifier 24 changes, and switching off the system for five cycles, or 0.33 seconds if the gain setting for amplifier 36 changes). The reason for performing substeps (b) and (c) is to minimize the effects of noise bursts typically occurring when the laser is initially turned on, or when the desired laser output power is changed. Preferably, step 244 also includes the substep of generating a signal indicative of the off/on status of the system for display by unit 32.

If the system remains switched "on" after step 244, the next step (step 248) is to determine whether the horizontal or the vertical transducer is currently being modulated (i.e., whether CPU 30 is asserting the horizontal mirror transducer signal "H" or the vertical mirror transducer signal "V"). If the vertical transducer is being modulated, then $V_{int}$, the integrated vertical error signal $V_{int}$ is updated by adding the error signal $r_i$ thereto (at step 250), and the updated $V_{int}$ signal is stored. The integrated vertical error signal $V_{out}$ is then updated (at step 252) by multiplying the updated $V_{int}$ signal with the user-specified gain parameter GAIN, and dividing the product by the quantity $2^{11}$. CPU 30 then waits for a selected delay period (25 milliseconds, in one preferred embodiment) during step 254, and the described steps, commencing with step 204 are repeated.

If, after step 226, CPU 30 asserts the horizontal mirror transducer signal "H" in place of the vertical mirror transducer signal "V," then CPU waits for a selected delay period (which may be an 8 millisecond period) during step 230, the phase of the modulation signal is changed by reversing the sense ("PHASE") of the modulation signal at step 232, and CPU 30 reads the digital output $B_{i-1}$ of down counter 44 at step 234. CPU already has the output signal $A_{i-1}$ (the most recent previous output from counter 42) in its memory, and computes the error signal $e_i = (A_{i-1}) - (B_{i-1})$ at step 236.

This error signal is processed in the same manner as previously described during steps 238, 240, and 242, and steps 244 and 248 are also repeated. If step 244 determines that the CPU continues to assert the horizontal mirror transducer signal "H," then the integrated horizontal error signal $H_{int}$ is updated by adding the error signal ri thereto (at step 256), and the updated $H_{int}$ signal is stored. The integrated horizontal error signal $H_{out}$ is then updated (at step 258) by multiplying the updated $H_{int}$ signal with the user-specified gain parameter GAIN, and dividing the product by the quantity $2^{11}$. CPU 30 then waits for a selected delay period (25 milliseconds, in one preferred embodiment) during step 260, and "horizontal modulation" steps 264–286 (corresponding to the above-described "vertical modulation" steps 204–226) are performed.

At step 276, an encoded version of the biased, modulated error signal is generated during linearization table lookup step 274 is supplied on the above-described multibus from CPU 30 to buffer/decoder circuit 46 for subsequent conversion to analog form in converter 50 for use in driving horizontal mirror positioning transducer 18.

An ordinarily skilled programmer will be able readily to generate software for programming CPU 30 to perform the FIG. 6 embodiment of the inventive method. A commercially available Z-80 microprocessor is suitable for use as CPU 30. Alternatively, other commercially available microprocessors may be suitable for use as CPU 30. In yet another alternative embodiment, CPU 30 may be replaced by analog circuitry hardwired to implement the described method steps. In such analog circuit variation of the invention, a minimal amount of "smart" circuitry would be required to implement the automatic gain control function described with reference to FIG. 3, and to deactivate the inventive servo upon detection of zero output beam power (as described with reference to FIGS. 3 and 6).

Finally, an alternative laser operating parameter monitoring means will be described with reference to FIG. 7. The monitoring means comprising elements 140, 142, 144, and 146 of FIG. 7 may be substituted for any of the above-described monitoring means (such as detector 22 of FIG. 3, or detector 72 of FIG. 1).

Figure 7:
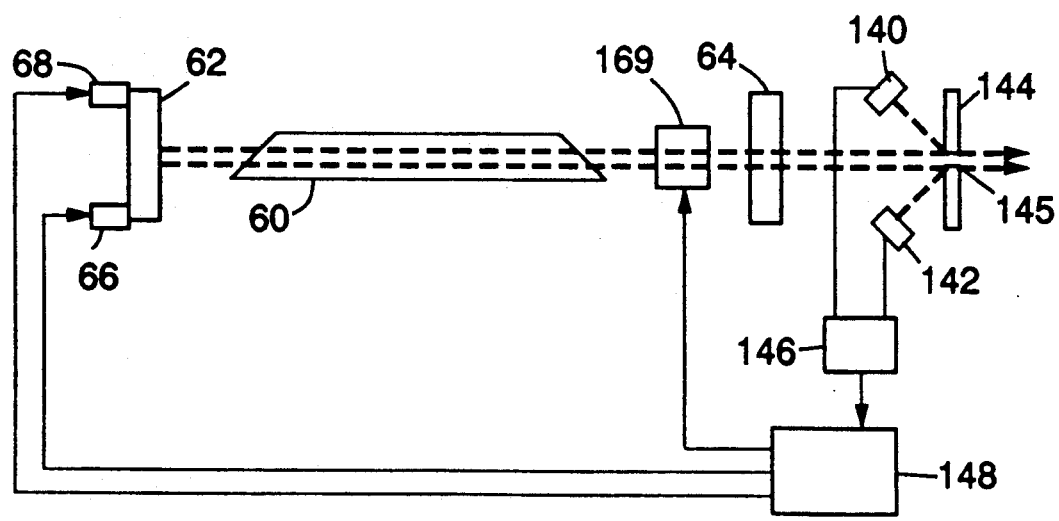
FIG. 7 is a block diagram of a portion of another preferred embodiment of the inventive apparatus.

The FIG. 7 system includes a laser having an optical cavity including gain medium 60, resonator end mirror 62, and partially transmissive resonator output mirror 64, as in FIG. 1, and including adjustable intra-cavity means 169 for varying beam alignment. Transducers 66 and 68 may also be operated to tilt mirror 62, in order to vary the beam alignment. Either transducers 66 and 68 or means 169 may be omitted from the FIG. 7 system.

Since output mirror 64 is partially transmissive, the laser output beam propagates toward the right, from gain medium 60 toward plate 144. An aperture extends through plate 144. A first portion of the output beam is reflected from aperture 145 toward photodetector 140, and a second portion of the output beam is reflected from aperture 144 toward photodetector 142. The output signals from detectors 140 and 142 are subtracted in subtraction circuit 146.

When the laser beam is optimally aligned, most of the energy in the beam propagates through the aperture in plate 144, and substantially equal portions of the beam energy reflect from plate 144 onto detectors 140 and 142. When the beam alignment is non-optimal, unequal amounts of beam energy reflect onto detectors 140 and 142.

The output signal from subtraction circuit 146 is supplied as a feedback signal to alignment servo control unit 148. Unit 148 generates alignment control signals from the output of circuit 146, for controlling one or more of means 169 and transducers 66 and 68. The laser beam alignment need not be dithered (by modulating element 169 or reciprocating mirror 62) while the output signal from circuit 146 is processed in unit 148.

In embodiments in which the laser beam alignment is dithered (by modulating element 169 or reciprocating mirror 62) while the output signal from unit 146 is processed in unit 148, unit 148 may be of the same type as any of the means described above for processing any of the described laser operating parameter signals. For example, unit 148 may include the means described with reference to FIG. 1, for processing the output of detector 72. In embodiments in which the laser beam alignment is not dithered while the output signal from unit 146 is processed in unit 148, a suitable unit 148 may be selected from conventional servo control circuits. For example, in this latter class of embodiments, unit 148 may comprise integrator 78 (described with reference to FIG. 1) connected in series with driver 80 (described with reference to FIG. 1).

Various modifications and alterations in the specific embodiments described above will be apparent to those skilled in the art without departing from the scope and spirit of the invention. Although the invention has been described in connection with specific preferred embodiments, the invention as claimed should not be unduly limited to such specific embodiments.

What is claimed is:

1. An apparatus for optimizing the performance of a laser, said laser generating a beam having an alignment, said apparatus comprising:
    means for monitoring the angular or lateral alignment of the beam and generating a control signal based on the angular or lateral alignment; and
    means for varying the angular or lateral alignment of the beam in response to the control signal to optimize the performance of the laser.

2. A method for optimizing the performance of a laser, said laser generating a beam having an alignment, said method comprising the steps of:
    monitoring the angular or lateral alignment of the beam and generating a control signal based on the angular or lateral alignment; and varying the angular or lateral alignment of the beam in response to the control signal to optimize the performance of the laser.

3. An apparatus for optimizing the performance of a laser, said laser having a resonator and generating a beam having an alignment within the resonator, said apparatus comprising:

means for monitoring the position of the beam at a location outside of the resonator and generating a position control signal; and means for varying the angular or lateral alignment of the beam within the laser in response to the control signal to maintain the position of the beam at said location outside of the resonator and optimize the performance of the laser.

4. An apparatus as recited in claim 3 wherein said means for monitoring the position of the beam includes photodetector means.

5. An apparatus as recited in claim 3 wherein said means for monitoring the position of the beam includes at least two photodetector elements, the output of which can be compared to generate a signal indicative of the position of the beam.

6. An apparatus as recited in claim 3 wherein said means for varying the angular or lateral alignment of the beam comprises:

a laser resonator mirror; and means for varying the angle of said mirror.

7. A method for optimizing the performance of a laser, said laser having a resonator and generating a beam having an alignment within the resonator, said method comprising the steps of:

monitoring the position of the beam at a location outside of the resonator and generating a position control signal; and varying the angular or lateral alignment of the beam within the laser in response to the control signal to maintain the position of the beam at said location outside of the resonator and optimize the performance of the laser.

8. A laser comprising:

a resonator including a pair of mirrors;

a gain medium located within the resonator for generating a laser beam;

means for monitoring the position of the beam at a location outside of the resonator and generating a position control signal; and means for varying the angle of one of said mirrors in response to the control signal to maintain the position of the beam at said location outside of the resonator and optimize the performance of the laser.

9. An apparatus as recited in claim 1 wherein said means for varying the angular or lateral alignment of the beam comprises:

a laser resonator mirror; and means for varying the angle of said mirror.

10. The method as recited in claim 2 wherein said step of varying the angular or lateral alignment of the beam is performed by varying the angle of a resonator mirror.

11. The method as recited in claim 7 wherein said step of varying the angular or lateral alignment of the beam is performed by varying the angle of a resonator mirror.

* * * * *